United States Patent
Xydis

(10) Patent No.: US 7,589,614 B2
(45) Date of Patent: Sep. 15, 2009

(54) METHOD OF ALLOWING ACCESS TO AN ELECTRONIC DEVICE

(75) Inventor: Thomas G Xydis, Manitou Beach, MI (US)

(73) Assignee: Ensure Technologies, Inc., Ypsilanti, MI (US)

( * ) Notice: Subject to any disclaimer, the term of this patent is extended or adjusted under 35 U.S.C. 154(b) by 569 days.

(21) Appl. No.: 10/948,497

(22) Filed: Sep. 23, 2004

(65) Prior Publication Data

US 2005/0044424 A1 Feb. 24, 2005

Related U.S. Application Data

(63) Continuation-in-part of application No. 09/997,299, filed on Nov. 29, 2001.

(60) Provisional application No. 60/505,082, filed on Sep. 23, 2003, provisional application No. 60/250,293, filed on Nov. 29, 2000.

(51) Int. Cl.
*H04Q 1/00* (2006.01)
(52) U.S. Cl. ........................ 340/5.61; 726/16
(58) Field of Classification Search ........... 340/5.61; 713/200; 726/3, 4, 5, 21
See application file for complete search history.

(56) References Cited

U.S. PATENT DOCUMENTS

| | | | |
|---|---|---|---|
| 4,191,958 A | 3/1980 | Hulland et al. | |
| 4,791,409 A * | 12/1988 | Reid | 340/825.72 |
| 5,056,106 A | 10/1991 | Wang et al. | |
| 5,311,185 A | 5/1994 | Hochstein et al. | |
| 5,396,224 A | 3/1995 | Dukes et al. | |
| 5,455,851 A | 10/1995 | Chaco et al. | |
| 5,572,528 A | 11/1996 | Shuen | |
| 5,673,031 A | 9/1997 | Meier | |
| 5,963,599 A | 10/1999 | Curtis et al. | |
| 5,969,678 A | 10/1999 | Stewart | |
| 5,983,347 A * | 11/1999 | Brinkmeyer et al. | 340/5.62 |
| 5,987,062 A | 11/1999 | Engwer et al. | |
| 6,021,333 A | 2/2000 | Anderson et al. | |
| 6,034,622 A | 3/2000 | Levine | |
| RE36,791 E | 7/2000 | Heller | |
| 6,088,451 A | 7/2000 | He et al. | |

(Continued)

FOREIGN PATENT DOCUMENTS

JP 62070587 A 9/1988

(Continued)

*Primary Examiner*—Brian A Zimmerman
(74) *Attorney, Agent, or Firm*—Howard & Howard Attorneys PLLC

(57) ABSTRACT

A method allows access to an electronic device disposed in a working space by a user having a remote device is disclosed. An access point transmits an initial signal instructing the remote device to respond after a delay period, which responds upon the expiration of the delay period. A distance of the remote device is determined based upon a period interval from the transmission of the initial signal to the detection of a response signal and the known positions of the access point and the electronic device. Alternatively, a fixed device transmits locating signals detected by three access points, which measure a time differential. The position of the remote device is determined based upon a time of arrival, the location of each of the access points, and the time differential. The electronic device is enabled when the remote device is within the predetermined distance range.

21 Claims, 9 Drawing Sheets

U.S. PATENT DOCUMENTS

| | | |
|---|---|---|
| 6,130,896 A | 10/2000 | Lueker et al. |
| 6,137,473 A | 10/2000 | Cortopassi et al. |
| 6,148,344 A | 11/2000 | Bi |
| 6,176,425 B1 | 1/2001 | Harrison et al. |
| 6,177,860 B1 | 1/2001 | Cromer et al. |
| 6,192,230 B1 | 2/2001 | van Bokhorst et al. |
| 6,249,226 B1 | 6/2001 | Harrison et al. |
| 6,279,153 B1 | 8/2001 | Bi et al. |
| 6,286,102 B1 | 9/2001 | Cromer et al. |
| 6,292,668 B1 | 9/2001 | Alanera et al. |
| 6,349,337 B1 | 2/2002 | Parsons, Jr. et al. |
| 6,546,425 B1 | 4/2003 | Hanson et al. |
| 6,556,942 B1 | 4/2003 | Smith |
| 6,580,356 B1 * | 6/2003 | Alt et al. .................. 340/5.61 |
| 6,629,151 B1 | 9/2003 | Bahl |
| 6,678,733 B1 | 1/2004 | Brown et al. |
| 6,694,366 B1 | 2/2004 | Gernert et al. |
| 6,731,242 B1 | 5/2004 | Rapeli |
| 6,732,176 B1 | 5/2004 | Stewart et al. |
| 6,745,013 B1 | 6/2004 | Porter et al. |
| 6,747,599 B2 | 6/2004 | McEwan |
| 6,748,226 B1 | 6/2004 | Wortham |
| 6,778,065 B1 * | 8/2004 | Asakura et al. ............. 340/5.61 |
| 6,803,851 B1 * | 10/2004 | Kramer et al. ............. 340/5.61 |
| 6,825,774 B1 * | 11/2004 | Groger ....................... 340/5.61 |
| 2002/0021206 A1 * | 2/2002 | Wootton et al. ............ 340/5.61 |

FOREIGN PATENT DOCUMENTS

| | | |
|---|---|---|
| JP | 2003101545 | 4/2003 |
| WO | WO 02/41026 A3 | 5/2002 |

* cited by examiner

METHOD OF ALLOWING ACCESS TO AN ELECTRONIC DEVICE

RELATED APPLICATIONS

This application claims priority to Provisional Patent Application Ser. No. 60/505,082, filed Sep. 23, 2003 and this application is a Continuation-in-Part Application of co-pending U.S. patent application Ser. No. 09/997,299, filed Nov. 29, 2001, which claims priority to Provisional Patent Application Ser. No. 60/250,293, which was filed Nov. 29, 2000.

BACKGROUND OF THE INVENTION

1. Field of the Invention

The subject invention relates to a method of allowing access to an electronic device disposed in a working space by a user having a remote device in proximity to the electronic device.

2. Description of the Related Art

The related art provides various methods of determining the location of a remote device within a working space. The remote device includes a transmitter for emitting a radio frequency (RF) signal and a plurality of receivers positioned about an area for detecting the RF signals. U.S. Pat. No. 6,034,622 discloses receivers having internal clocks that must be synchronized and that detect RF signals. When the RF signals are detected, a time-of-arrival is detected at each of the receivers based upon the synchronized internal clocks. The internal clocks at each of the receivers are calibrated so that any time differences among them can be effectively zeroed out. The synchronization of these internal clocks is time consuming and is disadvantageous to allowing access to multiple electronic devices. Yet another method is disclosed in U.S. Pat. No. 6,556,942. The method utilizes short-range spread spectrum radiolocation techniques to determine the location of an object within a working space. However, the method requires the remote device to possess a fully synchronous architecture including an oscillator and a clock that is to be synchronized with the receivers.

U.S. Pat. No. Re. 36,791 discloses an object location system for use in multi-path environments. Multi-path is understood by those skilled in the art to include the transmission of an RF signal that does not take the shortest route to the receiver. In other words, the RF signal may be reflected off an object in the path to the receiver and then eventually reach the receiver or the RF signal may be transmitted through walls or the like. Multi-path issues result in inaccurate measurements of the distance between the remote device and the receiver. The '791 patent overcomes the multi-path issues by using multiple receivers that measure a time-of-arrival of the RF signals. However, each of the receivers includes internal clocks that must be synchronized. The synchronization occurs by a system processor coupled to the receivers by a network that generates a synchronization clock and transmits a signal to the receivers to synchronize to the clock. Such a system is time consuming and does not provide reliable distance measurements sufficient to allow a user access to electronic devices.

The related art is characterized by one or more inadequacies, such as, but not limited to, requiring the synchronization to determine the position of the remote device. During the synchronization of the devices, an error is incorporated that the synchronization nulls out during each synchronization. This step of removing and nulling the error is time consuming and does not provide sufficiently reliable measurements for enabling and disabling electronic devices.

SUMMARY OF THE INVENTION

The subject invention provides a method of allowing access to an electronic device disposed in a working space by a user having a remote device in proximity to the electronic device. The method includes the steps of disposing the electronic device and an access point, both at known positions in the working space, and detecting the remote device with the access point. Next, an initial signal is transmitted from the access point instructing the remote device to respond after a delay period, the initial signal is detected with the remote device, and a response signal is transmitted from the remote device upon the expiration of the delay period. The response signal is detected with the access point and the access point measures a period interval from the transmission of the initial signal to the detection of the response signal. A distance of the remote device is determined from the electronic device based upon the period interval and the known positions of the access point and the electronic device and the distance is compared to a predetermined distance range. The electronic device is enabled in response to the distance of the remote device being within the predetermined distance range such that the user can access the electronic device.

The subject invention provides yet another method of allowing access to the electronic device. The method includes the steps of disposing at least three access points about the working space each at a known position and each of the access points connected to a network, compiling a database of known positions for each of the access points and connecting the database to the network. A fixed device is disposed at a known position relative to the working space and the position of the fixed device is stored in the database. The fixed device transmits locating signals and each of the access points detects the locating signals. A time differential is determined between the detection of the locating signal at each of the access points. Next, a radio frequency (RF) signal is transmitted from the remote device and detected by each of the access points. A time of arrival of the RF signal is measured at each of the access points and a distance of the remote device is determined based upon the time of arrival, the location of each of the access points, and the time differential. The distance is then compared to the predetermined distance range and the electronic device is enabled in response to the distance of the remote device being within the predetermined distance range such that the user can access the electronic device.

The subject invention allows the remote device and the access points to operate asynchronously which reduces the complexity of the devices and the system. The reduced complexity also decreases the manufacturing costs associated with such devices and the system. The subject invention does not require the internal clocks to be synchronized and does not require synchronization between the access points and the remote device. Another advantage of the subject invention is that the distance of the user relative to the electronic device is more accurately determined. The related art systems that require synchronization have inherent errors that are nulled out each time the systems are synchronized, which introduces an extra step that is time consuming. The subject invention eliminates this extra step and there is no need to synchronize the devices. The methods of the subject invention reduce and/or eliminate a majority of the multi-path issues of transmitted signals that are encountered by the related art because the subject invention predicts the multi-path a priori.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
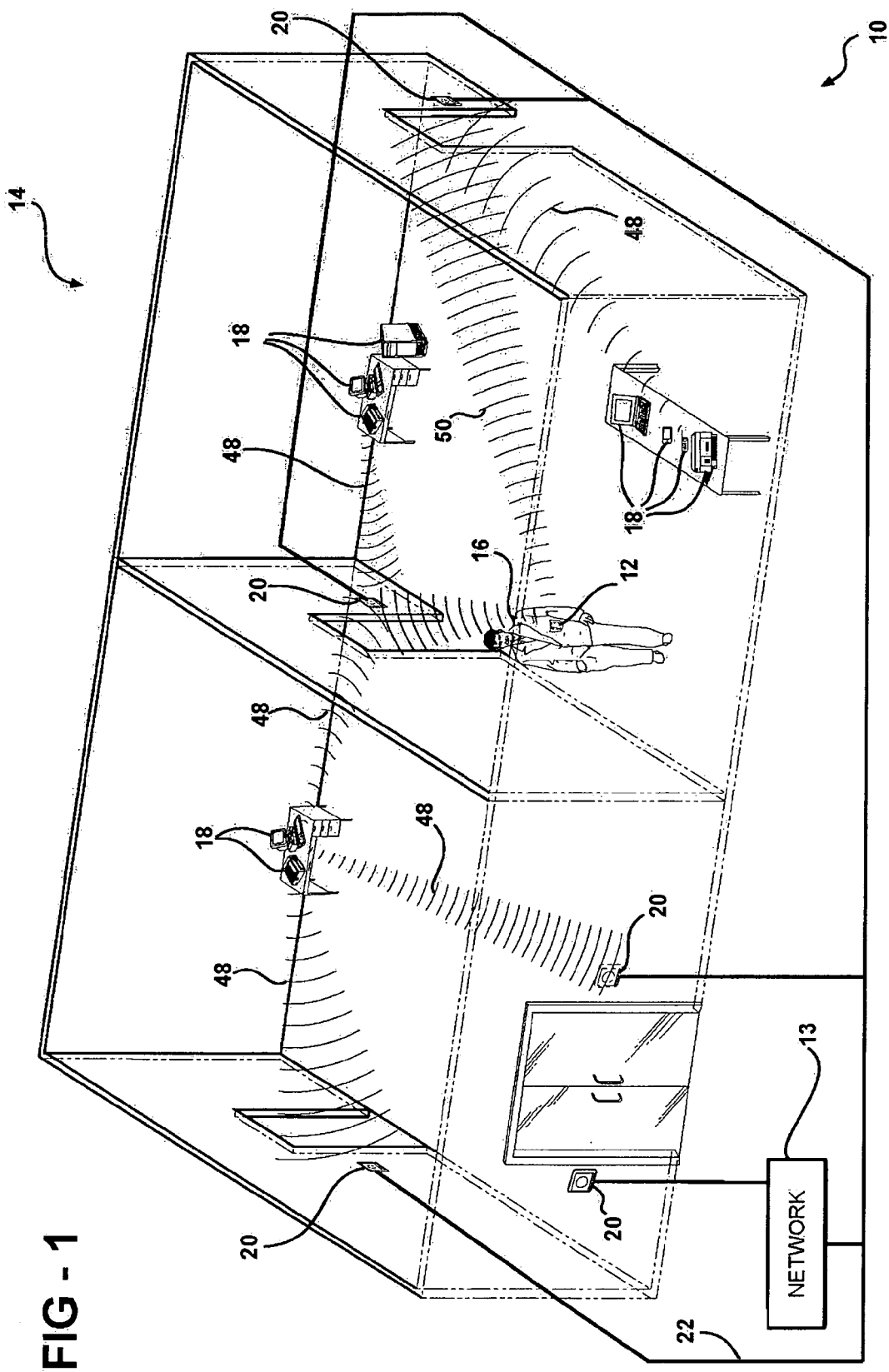
FIG. 1 is a perspective view of a working environment of a plurality of first electronic devices wirelessly connected to a network and a user moving about the working environment.

Referring to the figures, wherein like numerals indicate like or corresponding parts throughout the several views, a method of securing access to a network 13 is disclosed. A system for carrying out the method of the subject invention is illustrated in FIG. 1 at 10. Examples of the system 10 that the subject invention is particularly useful with include piconets and small area networks. The network 13 includes at least one first electronic device 18 and at least one access point 20 and is secured from a user 16 having a second electronic device 12.

Figure 2:
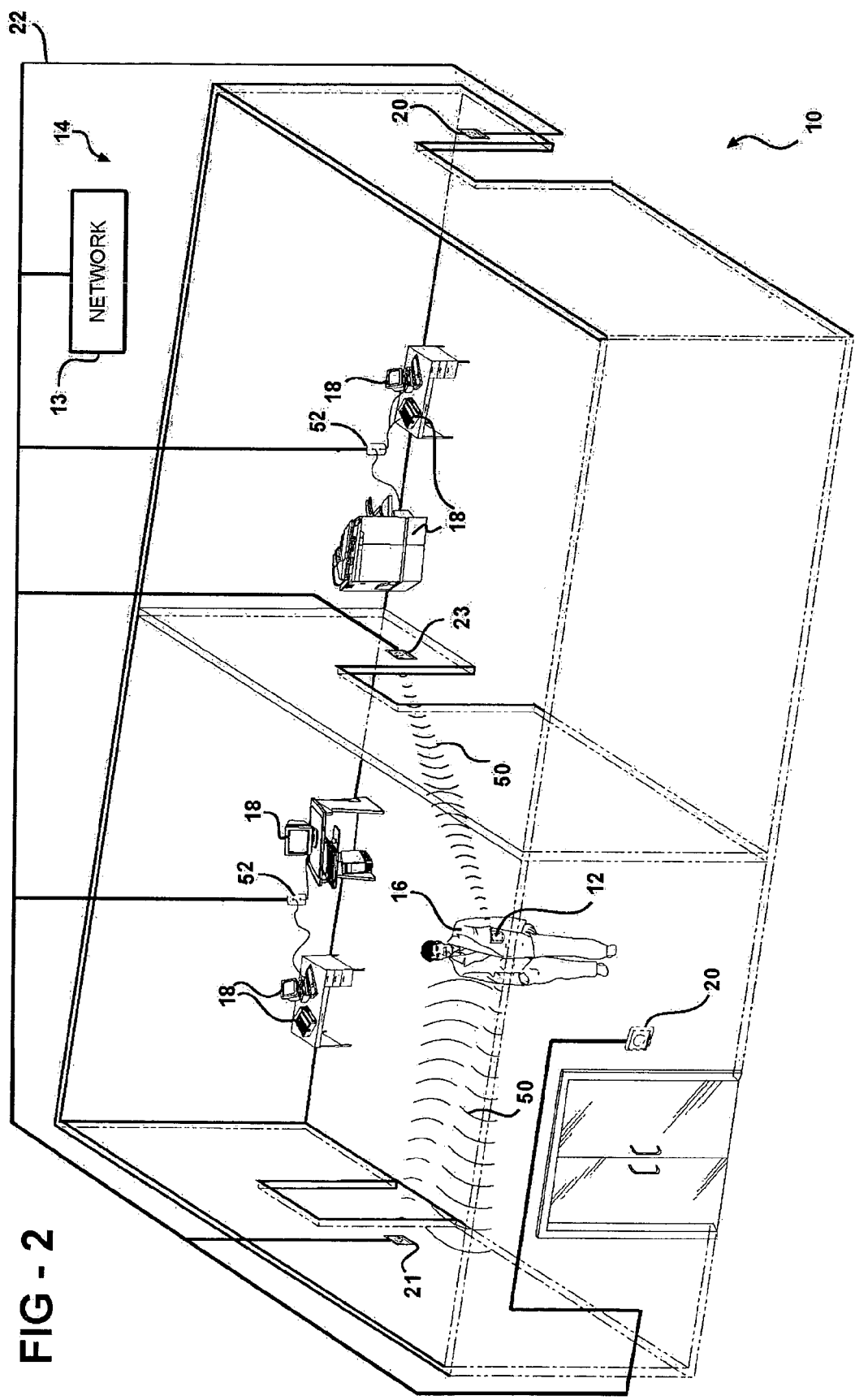
FIG. 2 is a perspective view of a working environment of a plurality of first electronic devices connected to a network and a user positioned in a first room.
Figure 3:
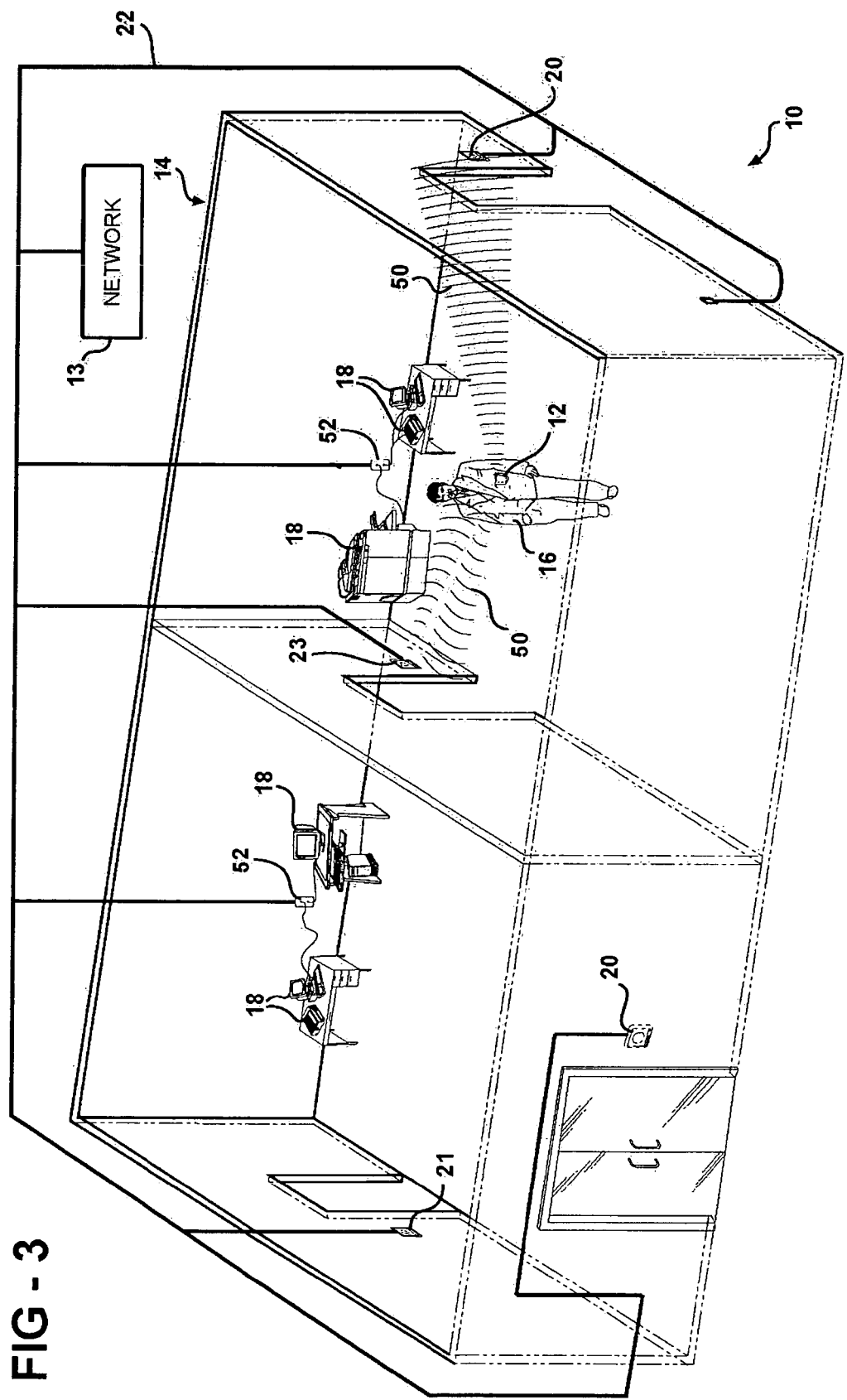
FIG. 3 is another perspective view of the working environment of FIG. 2 after the user has moved from the first room to a second room.

The system 10 is disposed within a working space 14 having a predetermined area. The area may include a plurality of buildings, a plurality of rooms, offices, etc. The area preferably has multiple users 16 who move about the working space 14 as illustrated in FIG. 1-3. As the user 16 moves about the working space 14, a plurality of first electronic devices 18 are positioned about the working space 14 that the user 16 may interact with. A plurality of access points 20 are positioned about the working space 14 and are in communication with the plurality of first electronic devices 18.

Figure 4:
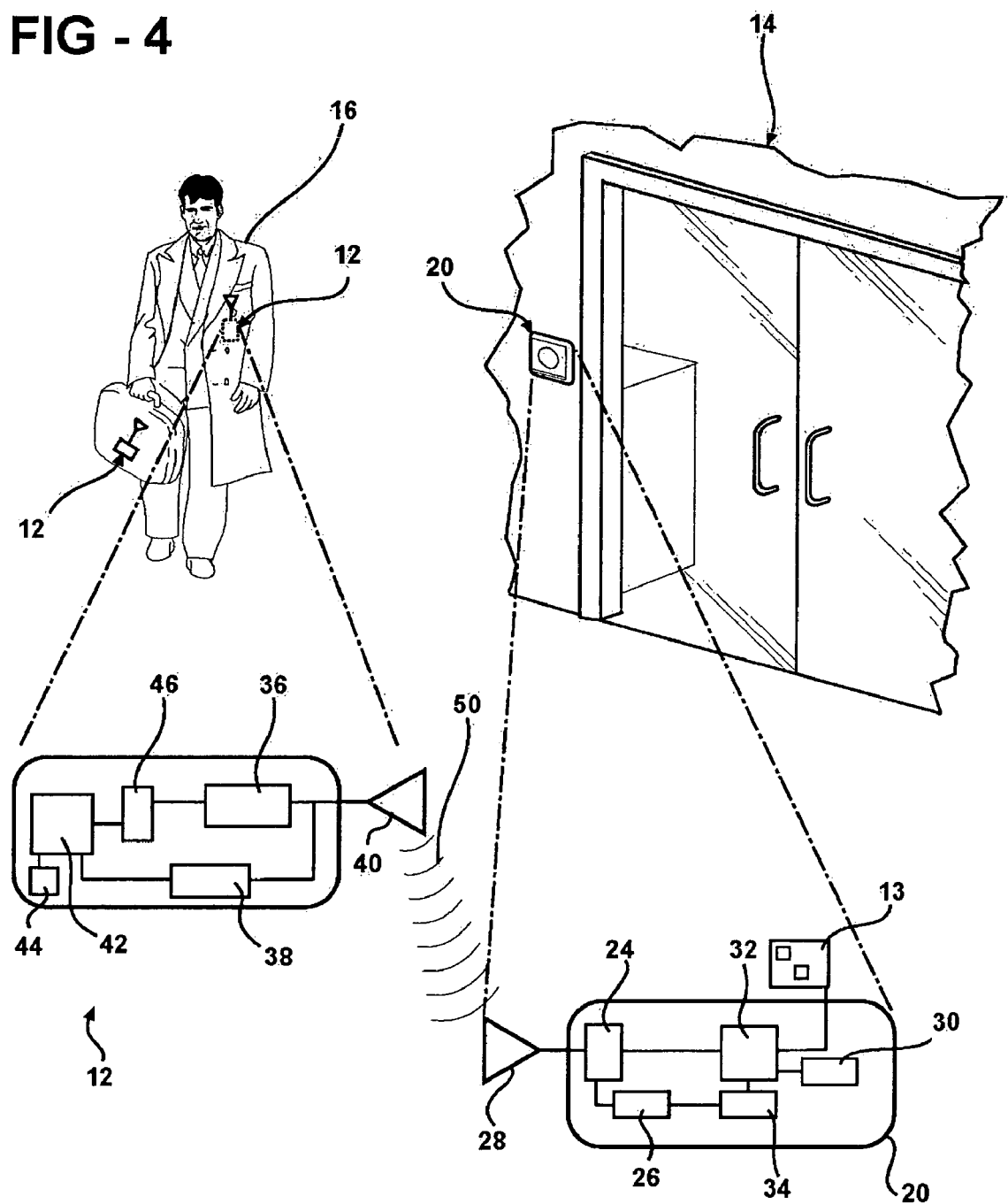
FIG. 4 is an exploded view of the user having a second electronic device and an access point for establishing communication between the second electronic device and the access point.

In one embodiment, the access points 20 include a hard link 22 to the network 13. The hard link 22 includes any wired connection as is known in the art. Referring to FIG. 4, the access points 20 also include a transmitter 24, a receiver 26, at least one antenna 28, a power supply 30, and a processor 32 for establishing wireless communication with the first electronic device 18 and/or the second electronic device 12. The power supply 30 may be connected to the working environment and therefore the access points 20 may not include the power supply 30. The access point 20 may also include a signal strength measurement device 34 for measuring the strength of the wireless signals.

The second electronic device 12, carried by the user 16, includes a transmitter 36, a receiver 38, at least one antenna 40, a processor 42, and a power supply 44. The second electronic device 12 may also include an authorization device 46 to authorize the user 16 to the second electronic device 12. The authorization device 46 may be biometrics, password entry, or any other methods known in the art of identifying a user 16. The second electronic device 12 may be a token, a card, a badge, or other identification carried by the user 16 to verify his identity.

The plurality of first electronic devices 18 includes a processor and a transceiver having a transmitter, a receiver, and at least one antenna. The first electronic device 18 circuitry is similar to that illustrated in FIG. 4 for the second electronic device 12, and therefore is not illustrated. The first electronic device 18 communicates by transmitting radio frequency (RF) signals 48 to the access points 20. The first electronic devices 18 may also include a signal strength measurement device for measuring the strength of RF signals. The first electronic devices 18 may include computers, printers, PDA's, copy machines, cellular phones, or other electronic device found in a working space 14.

Figure 5:
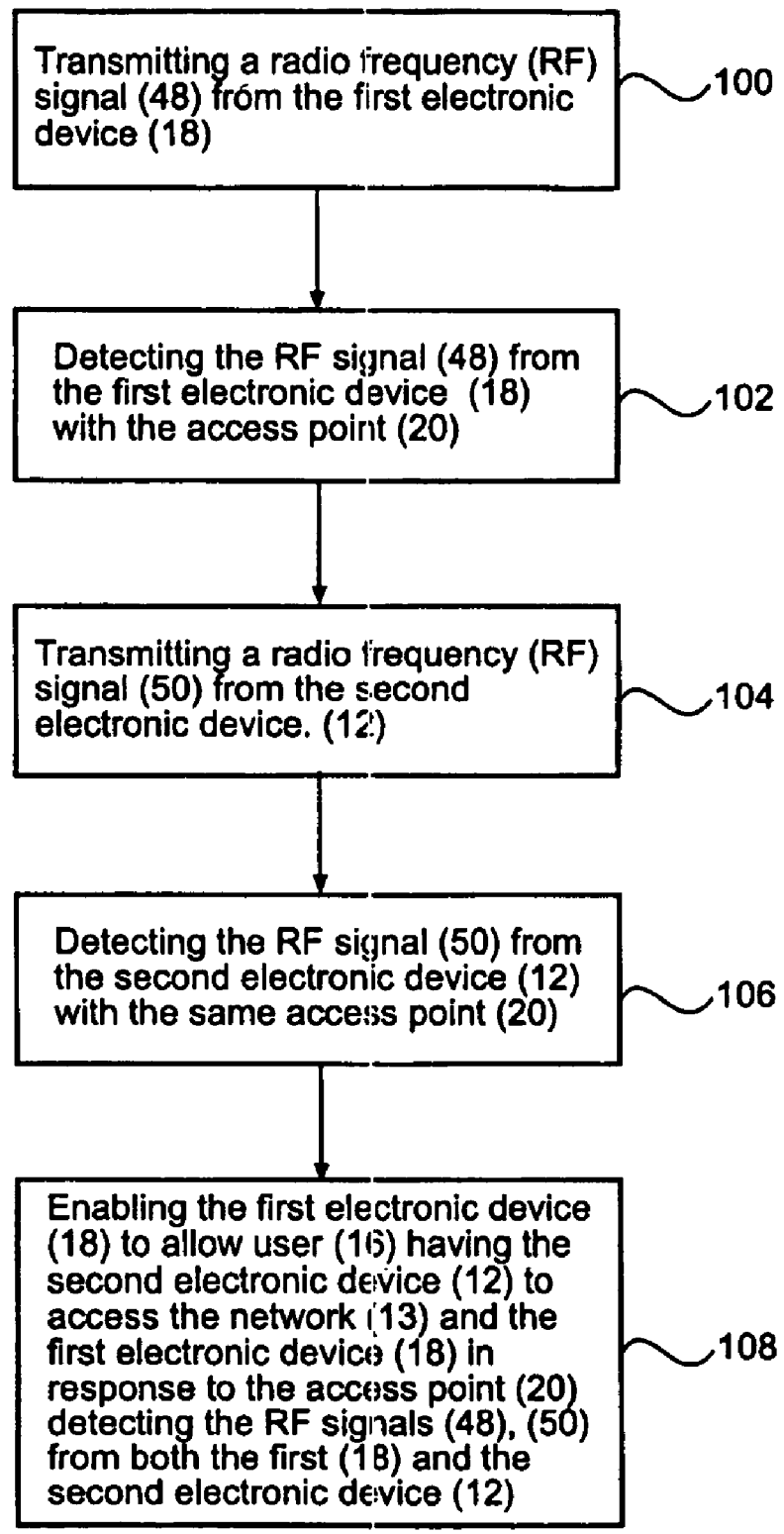
FIG. 5 is a flowchart depicting one of the methods of the subject invention.

Referring to FIG. 5, the method includes the steps of transmitting a RF signal 48 from the first electronic device 18 and detecting the RF signal 48 from the first electronic device 18 with the access point 20, in steps 100 and 102. The same RF signal 48 may be detected by multiple access points 20. The first electronic device 18 is preferably within the predetermined area when transmitting the RF RF signal 48. The first electronic device 18 may transmit the RF signal 48 at predetermined intervals or may respond to requests from the access point 20 to transmit the RF RF signal 48. The access point 20 would transmit a response signal to the first electronic device 18, the first electronic device 18 receives the response signal, and then would transmit the requested response to the access point 20.

The method also includes transmitting a radio frequency signal 50 from the second electronic device 12 and detecting the RF signal 50 from the second electronic device 12 with the same access point 20, in steps 104 and 106. The user 16 with the second electronic device 12 is preferably within the predetermined area when transmitting the RF signal 50. The second electronic device 12 may transmit the RF signal 50 at predetermined intervals or may respond to requests from the access point 20 to transmit the RF signal 50. The access point 20 would transmit a response signal to the second electronic device 12, the second electronic device 12 receives the response signal, and then would transmit the requested response to the access point 20.

The method enables the first electronic device 18 to allow the user 16 having the second electronic device 12 to access the network 13 and the first electronic device 18 in response to the access point 20 detecting the RF signals 48, 50 from both the first and the second electronic devices 12, in step 108. When the user 16 enters the predetermined area where the first electronic device 18 is located, both the first electronic device 18 and the second electronic device 12 are communicating with the same access point 20. The access point 20 receives both the first electronic device 18 and the second electronic device 12 RF signals 48, 50 and allows the user 16 to operate the first electronic device 18 since both RF signals 48, 50 are received by the same access point 20. The access point 20 then transmits an authorized signal to the first electronic device 18 thereby enabling the first electronic device 18 such that the user 16 can access the first electronic device 18. For example, in FIG. 1, the user 16 can access all of the first electronic devices 18, half through one access point 20 and the other half through the other access point 20.

The RF signals 50 from the second electronic device 12 may also include user information which the access point 20 may then utilize when enabling the first electronic device 18. The access point 20 receives the user information from the second electronic device 12 and compares the user information to a user database on the network 13. The user database stores user privileges such that the access point 20 only allows the user 16 access to certain portions of the network 13 listed as the user privilege.

The method further includes steps of measuring a signal strength for the RF signal 48, 50 from both the first 18 and the second electronic devices 12. The access point 20, after receiving the RF signal 48, 50 from either of the first 18 and the second electronic device 12, measures the signal strength and compares the signal strengths to a predetermined threshold. The predetermined threshold may be altered for different level of securities or different predetermined areas. For example, if an area has more than one access point, the predetermined threshold may be set high such that even though many access points 20 are receiving the RF signals 48, 50, very few access points 20 are measuring the signal strengths above the predetermined threshold. The access point 20 enables the first electronic device 18 in response to both of the signal strengths being above the predetermined threshold.

The signal strength measurement may be made by measuring the RF signal 48, 50 strength transmitted by each of the first 18 and the second electronic devices 12. The signal strength measurement may also be measured by utilizing more than one antenna and detecting the same RF signal 48, 50 with each of the antennas and determining the maximum signal strength. The signal strength measurement may also be determined from multiple signals from each of the devices and then determining an overall signal strength from the multiple signals for each of the first and the second devices 18, 12. It is to be understood that the signal strength may be measured by any other methods known in the art of RF signal strength measurement.

The first electronic device 18 is disabled in response to either one of the signal strengths from the first electronic device 18 and the second electronic devices 12 being measured below the predetermined threshold by the access point 20. As the user 16 moves about the working space 14, the RF signal 50 strength from the second electronic device 12 will change with the location to the access point 20. When the user 16 moves far away from the access point 20, the RF signal 50 strength from the second electronic device 12 falls below the predetermined threshold. The access point 20 transmits a disabling signal to the first electronic device 18 and disables the first electronic device 18 upon receiving the disabling signal.

After the first electronic device 18 has been enabled, the access point 20 may become a routing point for all data that is transmitted between the first 18 and the second electronic device 12. Either one of the first 18 and the second electronic devices 12 may transmit data to the access point 20, the access point 20 receives the data and then routes the data from the access point 20 to the other electronic device. For example, the first electronic device 18 may have a security setting which requires the signal strength to be measured at different intervals than the access point 20. The first electronic device 18 transmits a request for the second electronic device 12 to send a measurement signal and for the access point 20 to measure the signal strength. The access point 20 receives the request and transmits it to the second electronic device 12. The second electronic device 12 receives the request and transmits the measurement signal. The access point 20 receives the measurement signal and measures the signal strength. The access point 20 then transmits the signal strength to the first electronic device 18.

Alternately, after the access point 20 has enabled the first electronic device 18, the access point 20 may instruct the first 18 and the second electronic devices 12 to communicate directly with one another, thereby bypassing the access point 20. The access point 20 may also transmit timing intervals to either one of the first 18 and the second electronic devices 12 such that the electronic device is activated during the timing intervals to detect the signal from the other electronic device. The access point 20 may receive timing interval information from the second electronic device 12 as to when the second electronic device 12 will be transmitting signals. The access point 20 then transmits the timing interval to the first electronic device 18. The first electronic device 18 will then activate during those time intervals to detect the signals from the second electronic device 12. By only activating the first electronic device 18 when the second electronic device 12 is transmitting, the power consumption and the unauthorized detection of the transmitted signals is reduced. The timing interval information may also include transmission information, such as frequency and duration of the signal, so that the first electronic device 18 will know the frequency to receive the signal.

With multiple access points 20, more than one access point 20 may be detecting the RF signals 48, 50 from the first 18 and the second electronic devices 12. If the RF signal 48, 50 strengths fall below the predetermined threshold at one access point 20, a different access point 20 may also measure the RF signal 48, 50 strengths above the predetermined threshold. If the different access point 20 measures the signal strengths above the predetermined threshold, the first electronic device 18 may be re-enabled in response to the RF signals 48, 50 from the first 18 and the second electronic device 12 being above the predetermined threshold at the different access point 20. If at least one access point 20 is measuring the RF signal 50 from the second electronic device 12 as being above the predetermined threshold, the user data may be loaded into all other access points 20. The synchronizing of the user data from the different access points 20 to the first electronic device 18 is in response to the RF signal 50 strength from the second electronic device 12 being above the predetermined threshold at the different access point 20. Since the user 16 is able to move about the predetermined area, the RF signal 50 from the second electronic device 12 may be continuously detected by the other access points 20. If the RF signal 50 from the second electronic device 12 falls below the predetermined threshold at one access point 20, but remains above the predetermined threshold at the different access point 20, the first electronic device 18 and the network 13 remain enabled. By loading the user data into the other access points 20, the first electronic device 18 and the network 13 may switch to the different access point 20 without disabling the first electronic device 18.

In another embodiment of the subject invention, referring to FIGS. 2 and 3, the first electronic device 18 is connected to the network 13 via a hardwired link 52. The hardwire link 52 may be either a serial, parallel, or USB cable that extends from the network 13. The first electronic device 18 includes a card or similar device for receiving the hardwire link and thereby establishing a connection to the network 13. The system 10 includes a plurality of first electronic devices 18 connected to the network 13 through these hardwire links 52. The access points 20 and the second electronic device 12 include the same components as described above.

Figure 6:
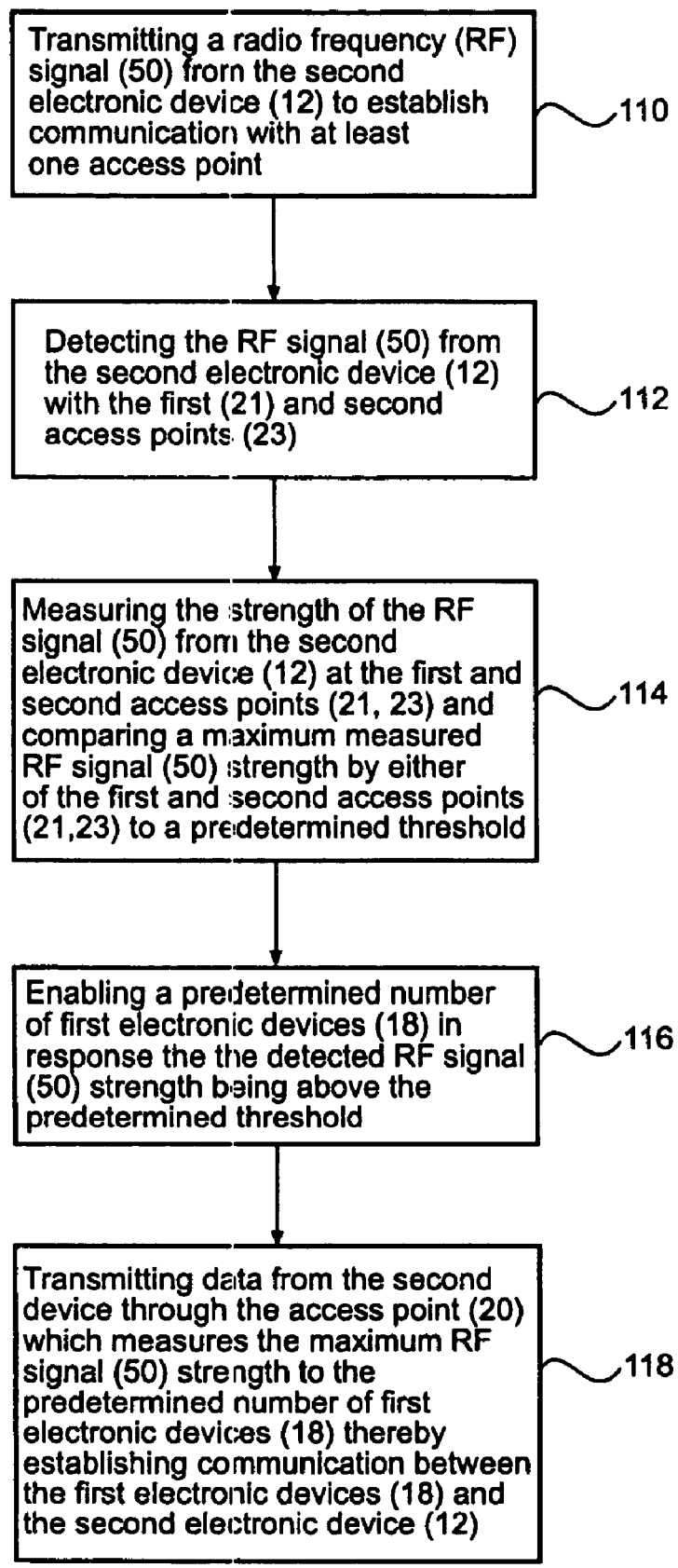
FIG. 6 is a flowchart depicting another method of the subject invention.

This embodiment provides a method of securing access to the network 13, as depicted in FIG. 6. The method includes the steps of transmitting the RF signal 50 from the second electronic device 12 to establish communication with at least one access point 20, in step 110, and detecting the RF signal 50 from the second electronic device 12 with a first and a second access points 21, 23, in step 112. The first and second access points 21, 23 measure the strength of the RF signal 50 from the second electronic device 12 and compare a maximum measured RF signal 50 strength by either of the first and second access points 21, 23 to a predetermined threshold, in step 114. In step 116, a predetermined number of first electronic devices 18 are enabled in response to the detected RF signal 50 strength being above the predetermined threshold at either of the first and second access points 21, 23. The predetermined number of first electronic devices 18 include the first electronic devices 18 positioned relative to one another. For example, one room may have a computer, a printer, and a cellular phone. When the second electronic device 12 establishes communication with the access point 20 in the room, the user 16 is authorized to use any of the devices.

The method transmits data, in step 118, from the second electronic device 12 through the access point 20 which measures the maximum RF signal 50 strength, to the predetermined number of first electronic devices 18 thereby establishing communication between the first electronic devices 18 and the second electronic device 12. If the second access point 23 measures the maximum signal strength, the second electronic device 12 establishes communication with the second access point 23 to transmit data to the first electronic devices 18. While communicating with the second access point 23, the first access point 21 continues to measure the RF signal 50 strength, such that if the first access point 21 measures the stronger RF signal 50 strength, the second electronic device 12 will establish communication through the first access point 21.

As both the first and second access points 21, 23 receive the RF signal 50, the user data is loaded into the first and second access points 21, 23. Therefore, as the user 16 moves about the predetermined area and the signal strength becomes stronger at the first access point 21 than the second access point 23, the first electronic devices 18 remain enabled as soon as communication is established with the first access point 21 because the user data is already loaded into the other access point 20.

The method further includes transferring communication to one of the first and second access points 21, 23 in response to the RF signal 50 strength at the other access point 20 falling below the predetermined threshold. The first electronic devices 18 are disabled in response to the RF signal 50 strength from the second electronic device 12 being measured below the predetermined threshold at both the first and second access points 21, 23. After the RF signal 50 strength is measured below the predetermined threshold at each access point 20, the user data is removed from the first and second access points 21, 23.

Figure 7:
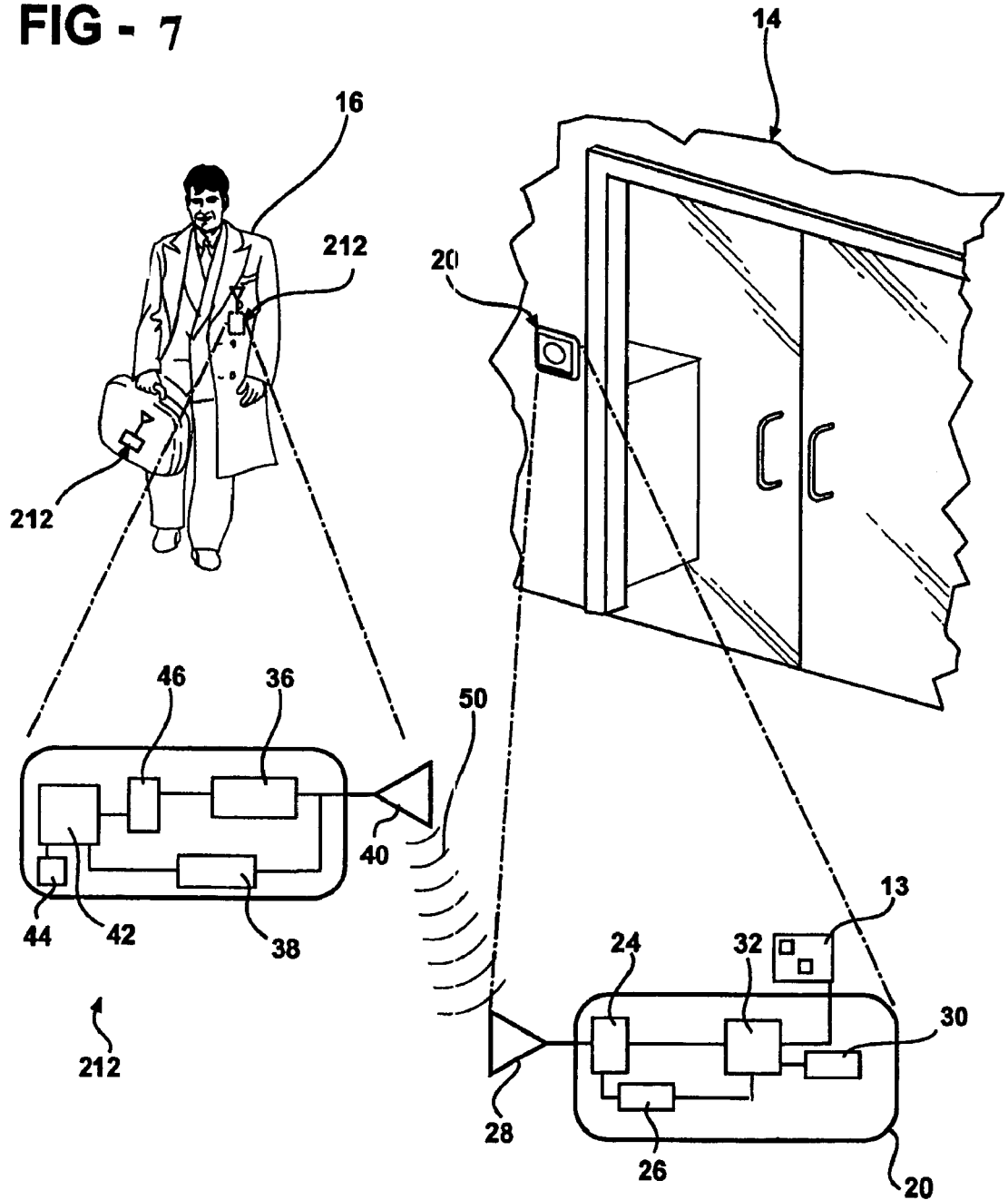
FIG. 7 is an exploded view of an alternate embodiment with a user having a remote device and an access point for establishing communication therebetween.
Figure 8:
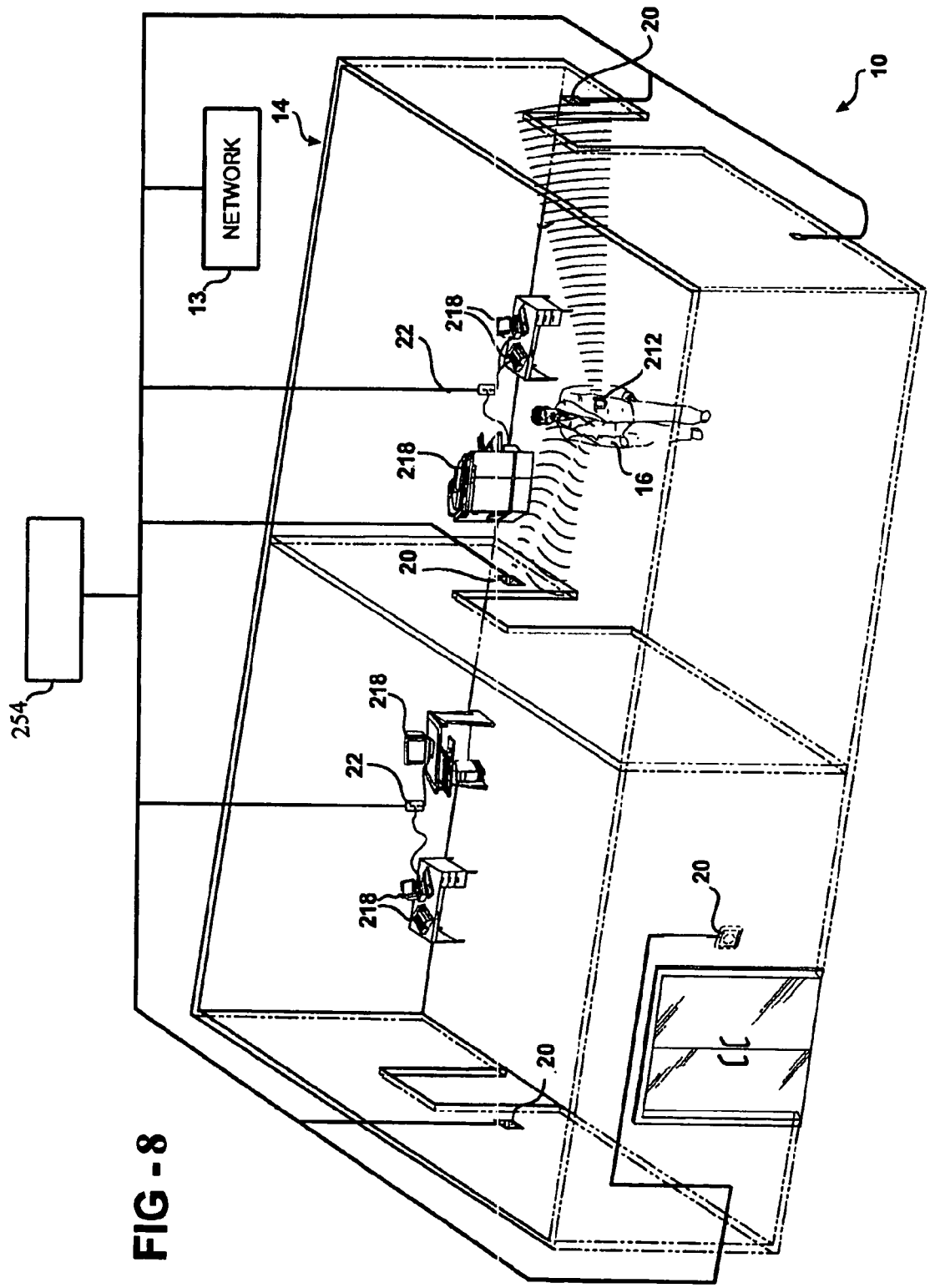
FIG. 8 is a perspective view of the working space having a plurality of access points and a plurality of electronic devices disposed therein.

An alternate embodiment of the subject invention is shown generally in FIGS. 7 and 8. Referring specifically to FIG. 7, the alternate embodiment includes a remote device 212, similar to the second electronic device 12 described above, carried by the user 16. The remote device 212 includes the transmitter 36, the receiver 38, at least one antenna 40, the processor 42, and the power supply 44. Those skilled in the art recognize that the transmitter 36 and the receiver 38 may be combined into a transceiver (not shown). The remote device 212 may also include the authorization device 46 to authorize the user 16 to the remote device 212. The authorization device 46 may be biometrics, password entry, or any other methods known in the art of identifying a user. The remote device 212 may be a token, a card, a badge, or other identification carried by the user 16 to verify his identity.

Referring to FIGS. 8, access points 20, as described above, are disposed about the working space and a plurality of electronic devices 218 are also disposed about the working space. The electronic devices 218 may include computers, printers, PDA's, copy machines, cellular phones, or other electronic devices found in a typical working space 14. The electronic devices 218 may be connected to the network 13 via the hard link 22 or via wireless connections. If wireless connections are employed to connect the electronic devices 218 to the network 13, then the electronic devices 218 include either a transmitter, a receiver, and at least one antenna or a transceiver as understood by those skilled in the art. The electronic device 218 circuitry is similar to that illustrated in FIG. 7 for the remote device 212, and therefore is not illustrated. When using wireless connections, the electronic device 218 may communicate through the access points 20 to connect to the network 13.

The alternate embodiment also provides a method of allowing access to the electronic device 218 by the user 16 having the remote device 212 in proximity to the electronic device 218. The method includes the step of disposing the electronic device 218 and the access point 20 at known positions in the working space 14 and detecting the remote device 212 with the access point 20. Various methods are known to those skilled in the radio frequency arts for detecting the remote device 212 with the access point 20. As one example, the remote device 212 may transmit an alert signal that pings all of the access points 20 to identify the remote device 212 to the access points 20. As another example, the access points 20 may ping any remote devices 212 that are within reception and then the remote devices 212 may respond thereby identifying itself to the access point 20.

After detecting the remote device 212, an initial signal is transmitted from the access point 20 instructing the remote device 212 to respond after a delay period. The remote device 212 detects the initial signal and transmits a response signal upon the expiration of the delay period. The initial signal may include a data sequence to be re-transmitted as the response signal. Preferably, both the initial signal and the response signal are radio frequency (RF) signals as understood by those skilled in the art. The RF signals may be direct hopping spread spectrum (DSSS) or frequency hopping spread spectrum (FHSS) or any other known transmission techniques. The access point 20 detects the response signal and a period interval is measured. The period interval is defined as the time from the transmission of the initial signal to the detection of the response signal by the access point 20. Said another way, the access point 20 begins to measure the time as soon as the initial signal is transmitted and the time is stopped when the access point 20 detects the response signal. The measured time is the period interval for that transmission and is determined without having to synchronize the internal clocks.

The subject invention allows the remote device 212 and the access points 20 to operate asynchronously which reduces delay between transmissions. The related art system requires the remote devices 212 and the access point 20 to be synchronized and the synchronization requires additional signals to be transmitted. Therefore, the synchronization takes additional time that the user 16 may be detect while attempting to access the electronic device 218. The synchronization also includes an error that must be factored out during the synchronization and the error may lead to less accurate measurements of the distance of the remote device. Further, synchronization requires that each of the devices have internal clocks and the internal clocks must be synchronized by transmitting additional signals back and forth, which increases the cost of manufacturing the related art devices and systems. The subject invention does not require the synchronization. The remote device 212 of the subject invention only needs to delay the response signal until after the delay period and the access point 20 may include a counter for measuring time or the processor may measure the time. Transmitting the response signal after the delay period ensures that the access point 20 knows the clock of the remote device 212 without having to be synchronized and without incorporating any errors that arise during synchronization. Further, additional signals do not have to be transmitted that may slow down the access to the electronic device 218.

Once the period interval is measured, a distance of the remote device 212 is determined from the electronic device 218 based upon the period interval and the known positions of the access point 20 and the electronic device 218. The distance is compared to a predetermined distance range and the electronic device 218 is enabled in response to the distance of the remote device 212 being within the predetermined distance range such that the user 16 can access the electronic device 218. The user 16 may then also access the network 13 if authorized. The electronic device 218 is disabled in response to the distance of the remote device 212 being outside the predetermined distance range such that the user 16 cannot access the electronic device 218.

The distance is determined by removing the delay period from the period interval and dividing the period interval in half to determine time of flight for either one of the initial signal and the response signal. Since the initial signal and the response signal are RF signals and the speed of sound is known, the distance that the remote device 212 is away from the access point 20 can be determined. When a single access point 20 is used, the distance from the access point 20 is determined in a single dimension represented by a radius of a sphere (not shown). Further, since the position of the electronic devices 218 are known relative to the access point 20, the distance of the remote device 212 from the electronic device 218 is determined and then compared to the predetermined distance range. The predetermined distance range may be varied depending upon the amount of security desired. For example, when the predetermined distance range is 15 feet, then the electronic device 218 is enabled when the remote device 212 is within 15 feet of the electronic device 218. If more security is desired, the predetermined distance range may be established at a closer distance.

The security of the subject invention can be further improved by disposing a plurality of access points 20 about the working space 14. The known positions for the access points 20 are compiled into a database 254 and the database 254 is connected to the network 13. When the remote device 212 is detected, one of the plurality of access points 20 transmits the initial signal and the remote device 212 transmits the response signal. The period interval of the transmissions of the initial signal and the response signal is then detected at each access points 20, including the access point 20 that transmitted the initial signal. The distance of the remote device 212 can be verified based upon the monitoring of the period interval by the remaining access points 20. Since each of the positions of the access points 20 are known, each access point 20 will measure the period interval and be able to spatially locate the remote device 212 in three dimensions. Therefore, instead of the distance only being known in one dimension, the precise three-dimensional distance of the user 16 is determined. The database 254 is updated with the period interval detected at each of the remaining access points 20 for error correction of the distance, i.e., a more precise distance is determined and only those electronic devices 218 within the predetermined distance range are enabled.

The subject invention preferably includes a plurality of electronic devices 218 disposed in the working space 14 with each having a known position stored in the database 254. Therefore, instead of enabling only one electronic device 218, a first set of the plurality of electronic devices 218 can be enabled when the distance of the remote device 212 is within the predetermined distance range. Further, the subject invention allows for a second set of the plurality of electronic device 218 to be disabled when the remote device 212 is outside the predetermined distance range.

Another security feature is that the user 16 may be required to authenticate his identity at the electronic device 218 after the electronic device 218 has been enabled. The user 16 may be authenticated by using biometrics, password entry, or any other methods known in the art of identifying a user 16. The preferred embodiment requires the user 16 to enter a password at the electronic device 218 that the user 16 wishes to access. In order to ensure that the user 16 only accesses the enabled electronic device 218, a list of authorized users 16 may be transmitted to the electronic device 218 to allow only those users 16 in the list access the electronic device 218. The list may be transmitted over the network 13 through either the hard link 22 or the wireless connections, depending upon how the electronic device 218 communicates with the network 13.

The remote device 212 may also transmit an identification signal to identify the remote device 212 to the access point 20 and the access point 20 then detects the identification signal. The database 254 may associate the identification signal of the remote device 212 for a specific user 16 and that user 16 may be limited to certain electronic devices 218. Preferably, the identification signal is transmitted with the initial signal from the remote device 212; however, the identification signal may be transmitted continuously or intermittently and before or after the distance is determined.

Figure 9:
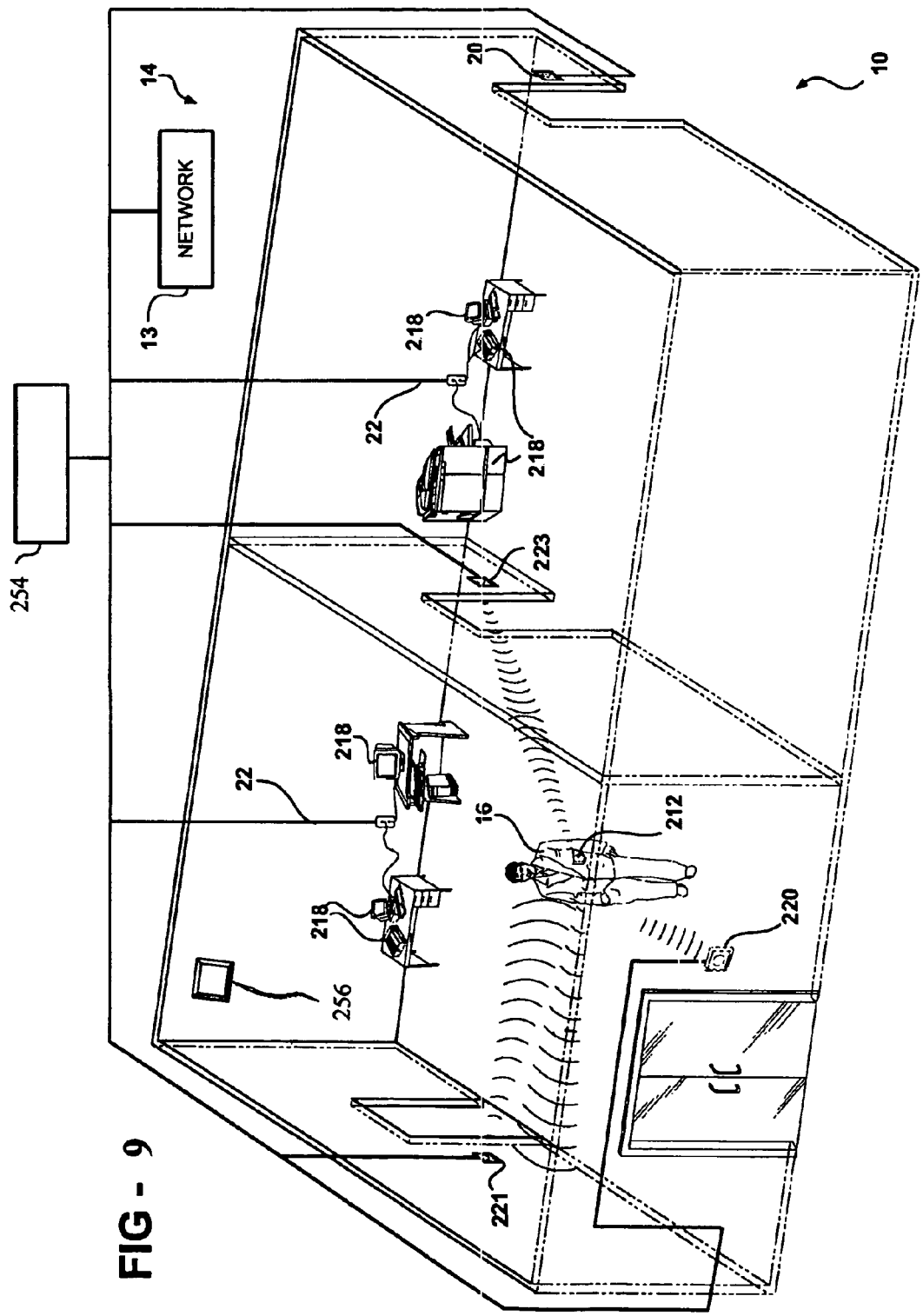
FIG. 9 is a yet another perspective view of the working space having a plurality of access points and a plurality of electronic devices disposed therein.

Referring to FIG. 9, a perspective view of another alternate embodiment of the working space 14 is illustrated. The another alternate embodiment provides a method that includes the steps of disposing at least three access points 220, 221, 223 about the working space 14 such that each of the access points 220, 221, 223 is at a known position. Additionally, each of the access points 220, 221, 223 is connected to the network 13. The known position for each of the access points 220, 221, 223 is compiled into the database 254 and the database 254 is also connected to the network 13. A fixed device 256 is disposed at a known position relative to the working space 14. The fixed device 256 may include a transmitter and/or a receiver or the fixed device 256 may be a transceiver. The position of the fixed device 256 is then stored in the database 254.

The fixed device 256 transmits locating signals and the locating signals are detected at each of the access points 220, 221, 223. The locating signals are coincidently detected at the access points 220, 221, 223 such that the access point 221 closest to the fixed device 256 measures the locating signal first, followed by the next closest access point 223 and so forth. A time differential is measured between the detection of the locating signal at each of the access points 220, 221, 223, which is a function of the distance that the access point 220, 221, 223 is away form the fixed device 256. Again, the remote device 212 and the access points 220, 221, 223 interact asynchronously which has various advantages over the related art methods that require synchronization. In this alternate embodiment, the asynchronous interaction occurs by each of the access points 220, 221, 223 measuring the time differential and knowing the difference of the internal clocks. Therefore, the access points 220, 221, 223 do not need to transmit additional signals to be synchronized. Eliminating the need to synchronize the access points 220, 221, 223 improves the measurement of the remote deice while also reducing manufacturing costs.

The method also includes the step of transmitting a radio frequency (RF) signal from the remote device 212 and detecting the RF signal with each of the access points 220, 221, 223. A time of arrival of the RF signal is then measured at each of the access points 220, 221, 223. The distance of the remote device 212 is determined based upon the time of arrival, the location of each of the access points 220, 221, 223, and the time differential. Said another way, the time differential is known for each of the access points 220, 221, 223 so any errors in the distance of the remote device 212 can be reduced since the positions of the access points 220, 221, 223 and the fixed device 256 are known.

The distance of the remote device 212 is compared to a predetermined distance range and the electronic device 218 is enabled in response to the distance of the remote device 212 being within the predetermined distance range such that the user 16 can access the electronic device 218. The electronic device 218 is disabled in response to the distance of the remote device 212 being outside the predetermined distance range such that the user 16 cannot access the electronic device 218.

As discussed above, additional steps may be employed to increase security such as requiring the user 16 to authenticate his identity at the electronic device 218. The list of authorized users 16 may be transmitted to the electronic device 218 to allow only those users 16 in the list access the electronic device 218. Also, as discussed above, the position of the electronic devices 218 may be fixed and stored in the database 254 or the position may be dynamically determined using wireless connections.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of allowing access to an electronic device (218) disposed in a working space (14) by a user (16) having a remote device (212) in proximity to the electronic device (218), said method comprising the steps of:
   disposing the electronic device (218) selected from at least one of a computer, a printer, a personal digital assistant, a copy machine, and a cellular phone in communication with a network (13) at a known position in the working space (14);
   disposing an access point (20) in communication with the network (13) at a known position about the working space (14);
   detecting the remote device (212) with the access point (20);
   transmitting an initial signal from the access point (20) instructing the remote device (212) to respond after a delay period;
   detecting the initial signal with the remote device (212);
   transmitting a response signal from the remote device (212) upon the expiration of the delay period;
   detecting the response signal with the access point (20);
   measuring a period interval from the transmission of the initial signal to the detection of the response signal by the access point (20);
   determining a distance of the remote device (212) from the electronic device (218) based upon the period interval and the known positions of the access point (20) and the electronic device (218);
   comparing the distance to a predetermined distance range;
   enabling the electronic device (218) in response to the distance of the remote device (212) being within the predetermined distance range such that the user (16) can access the electronic device (218) and the network (13); and
   disabling the electronic device (218) in response to the distance of the remote device (212) being outside the predetermined distance range such that the user (16) can not access the electronic device (218) and the network (13).

2. A method as set forth in claim 1 further comprising the step of authenticating the user (16) at the electronic device (218) after the electronic device (218) has been enabled.

3. A method as set forth in claim 2 wherein the step of authenticating the user (16) further comprises the step of transmitting a list of authorized users (16) to the electronic device (218) to allow those users (16) to access the electronic device (218).

4. A method as set forth in claim 1 wherein the step of determining the distance further comprises the step of removing the delay period from the period interval and dividing the period interval in half to determine time of flight for either one of the initial signal and the response signal.

5. A method as set forth in claim 1 wherein the step of transmitting the initial signal is further defined as transmitting the initial signal including a data sequence to be re-transmitted as the response signal.

6. A method as set forth in claim 1 wherein the step of disposing the access point (20) is further defined as disposing a plurality of access points (20) about the working space (14).

7. A method as set forth in claim 6 wherein the step of transmitting the initial signal is further defined as transmitting the initial signal from one of the plurality of access points (20).

8. A method as set forth in claim 7 further comprising the step of compiling a database (254) of known positions for the access points (20) and connecting the database (254) to a network (13).

9. A method as set forth in claim 8 further comprising the step of detecting the period interval of the transmissions of the initial signal and the response signal at each of the remaining access points (20).

10. A method as set forth in claim 9 further comprising the step of verifying the distance based upon the monitoring of the period interval by the remaining access points (20) and the known positions of the access points (20).

11. A method as set forth in claim 10 further comprising the step of updating the database (254) with the period interval detected at each of the remaining access points (20) for error correction.

12. A method as set forth in claim 8 wherein the step of disposing the electronic device (218) is further defined as disposing a plurality of electronic devices (218) in the working space (14) each having a known position stored in the database (254).

13. A method as set forth in claim 12 further comprising the step of enabling a first set of the plurality of electronic devices (218) within the predetermined distance range and disabling a second set of the plurality of electronic device (218) outside the predetermined distance range.

14. A method as set forth in claim 1 wherein the step of detecting the remote device (212) further comprises the steps of transmitting an identification signal from the remote device (212) to identify the remote device (212) to the access point (20) and detecting the identification signal with the access point (20).

15. A method of allowing access to an electronic device (218) in communication with a network (13) disposed in a working space (14) by a user (16) having a remote device (212) in proximity to the electronic device (218), said method comprising the steps of:
- disposing at least three access points (220, 221, 223) about the working space (14) each at a known position and each of the access points (220, 221, 223) connected to a network (13);
- compiling a database (254) of known positions for each of the access points (220, 221, 223) and connecting the database (254) to the network (13);
- disposing a fixed device (256) at a known position relative to the working space (14);
- storing the position of the fixed device (256) in the database (254);
- transmitting locating signals from the fixed device (256);
- detecting the locating signals at each of the access points (220, 221, 223);
- determining a time differential between the detection of the locating signal at each of the access points (220, 221, 223);
- transmitting a radio frequency (RF) signal from the remote device (212);
- detecting the RF signal with the access points (220, 221, 223);
- measuring a time of arrival of the RF signal at each of the access points (220, 221, 223);
- determining a distance of the remote device (212) based upon the time of arrival, the location of each of the access points (220, 221, 223), and the time differential;
- comparing the distance to a predetermined distance range; and
- enabling the electronic device (218) in response to the distance of the remote device (212) being within the predetermined distance range such that the user (16) can access the electronic device (218) and the network (13); and
- disabling the electronic device (218) in response to the distance of the remote device (212) being outside the predetermined distance range such that the user (16) can not access the electronic device (218) and the network (13).

16. A method as set forth in claim 15 further comprising the step of authenticating the user (16) at the electronic device (218) after the electronic device (218) has been enabled.

17. A method as set forth in claim 16 wherein the step of authenticating the user (16) further comprises the step of transmitting a list of authorized users (16) to the electronic device (218) to allow those users (16) to access the electronic device (218).

18. A method as set forth in claim 15 further comprising the step of determining the position of the electronic device (218) in the working space (14) relative to the plurality of access points (220, 221, 223).

19. A method as set forth in claim 18 wherein the step of determining the position of the electronic device (218) further comprises the steps of fixing the position of the electronic device (218) and connecting the electronic device (218) to the network (13).

20. A method as set forth in claim 18 wherein the step of determining the position of the electronic device (218) further comprises the steps of transmitting radio frequency (RF) signals from the electronic device (218) and detecting the RF signals at each of the access points (220, 221, 223).

21. A method as set forth in claim 20 further comprising the step of updating the database (254) with the positions of the electronic device (218) in the working space (14).

* * * * *